(12) United States Patent
Nakagawa

(10) Patent No.: US 7,142,733 B1
(45) Date of Patent: Nov. 28, 2006

(54) DOCUMENT PROCESSING METHOD, RECORDING MEDIUM RECORDING DOCUMENT PROCESSING PROGRAM AND DOCUMENT PROCESSING DEVICE

(75) Inventor: Masaki Nakagawa, Fuchu (JP)

(73) Assignee: Japan Science and Technology Agency, Honcho Kawaquchi (JP)

( * ) Notice: Subject to any disclaimer, the term of this patent is extended or adjusted under 35 U.S.C. 154(b) by 0 days.

(21) Appl. No.: 10/049,102

(22) PCT Filed: Apr. 17, 2000

(86) PCT No.: PCT/JP00/02483

§ 371 (c)(1),
(2), (4) Date: Apr. 19, 2002

(87) PCT Pub. No.: WO01/13324

PCT Pub. Date: Feb. 22, 2001

(30) Foreign Application Priority Data

Aug. 11, 1999 (JP) .................................. 11-227231

(51) Int. Cl.
*G06K 9/03* (2006.01)
*G06F 15/00* (2006.01)

(52) U.S. Cl. ...................................... 382/310; 715/533

(58) Field of Classification Search ................ 382/177, 382/229, 290, 309, 310, 311, 257, 308; 715/531, 715/533, 540, 530; 400/120.07
See application file for complete search history.

(56) References Cited

U.S. PATENT DOCUMENTS

| | | | | |
|---|---|---|---|---|
| 4,204,232 A | | 5/1980 | Mizuno | |
| 4,629,342 A | * | 12/1986 | Futaki | 400/124.07 |
| 4,764,039 A | * | 8/1988 | Bublitz | 400/146 |
| 4,941,189 A | * | 7/1990 | Britt | 382/290 |
| 5,167,016 A | * | 11/1992 | Bagley et al. | 715/531 |
| 5,257,328 A | * | 10/1993 | Shimizu | 382/311 |
| 6,141,460 A | * | 10/2000 | Amer et al. | 382/257 |
| 6,219,453 B1 | * | 4/2001 | Goldberg | 382/229 |

FOREIGN PATENT DOCUMENTS

JP 63-220383 9/1988

(Continued)

OTHER PUBLICATIONS

International Search Report for International Application No. PCT/JP00/02483 (4 Pages).

(Continued)

*Primary Examiner*—Kanjibhai Patel
(74) *Attorney, Agent, or Firm*—Neifeld IP Law, PC

(57) ABSTRACT

In the present invention, an erroneously recognized character is corrected by making use of an output in dot characters or in a gray color. The recognized document file is outputted in dot characters or in a gray color image (S101). An operator writes a sign and a character for correction on the printout (S103). An image input of the correction inputted document is provided (S105) and the location of the character written with the recognized correction sign is detected (S107) for recognition of the written correction sign and character (111). The location of the detected character is brought into correspondence with the recognized correction sign (S113). According to the correspondence, the corresponding character is corrected by the correction processing corresponding to the correction sign (S115) and a result of the correction is outputted (S117).

14 Claims, 14 Drawing Sheets

FOREIGN PATENT DOCUMENTS

| | | |
|---|---|---|
| JP | 63220383 A | 9/1988 |
| JP | 06-076110 | 3/1994 |
| JP | 06-325214 | 11/1994 |
| JP | 07-044655 | 2/1995 |
| JP | 09-081666 | 3/1997 |
| WO | WO 01/13324 | 2/2001 |

OTHER PUBLICATIONS

English Language International Preliminary Examination Report completed Jul. 4, 2001.

* cited by examiner

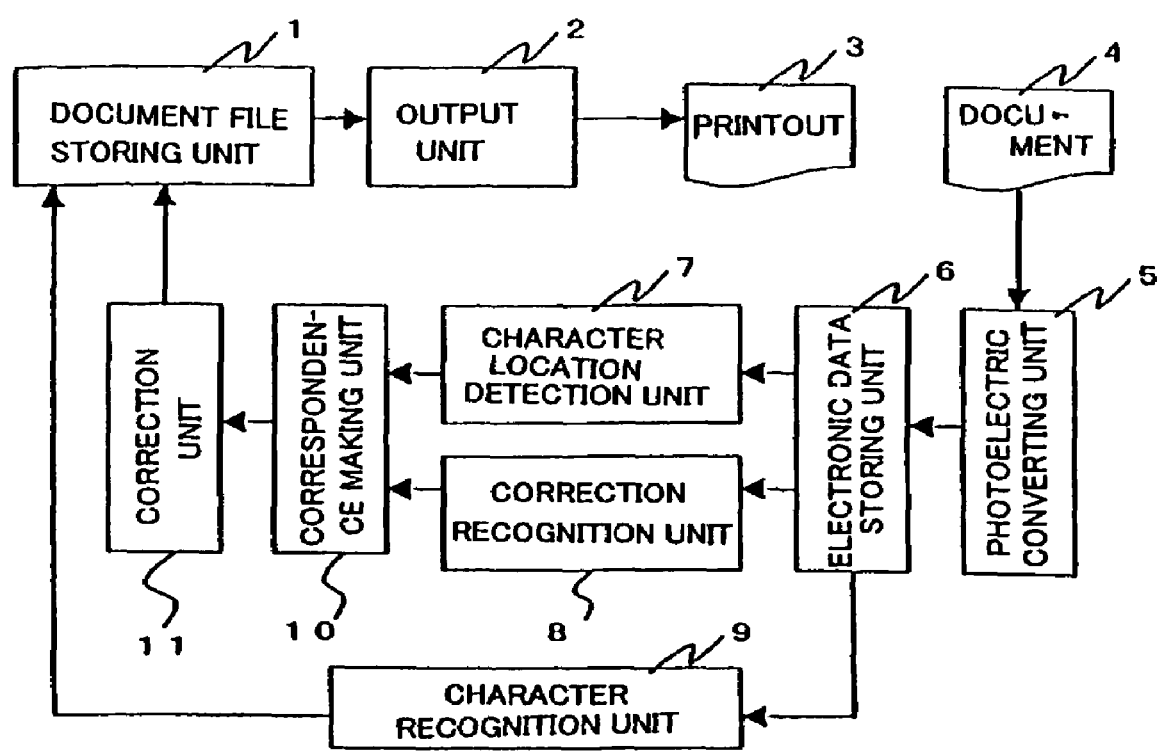
F I G. 1

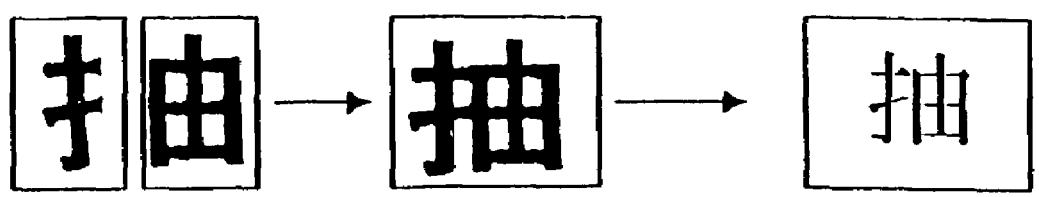
F I G. 1 1

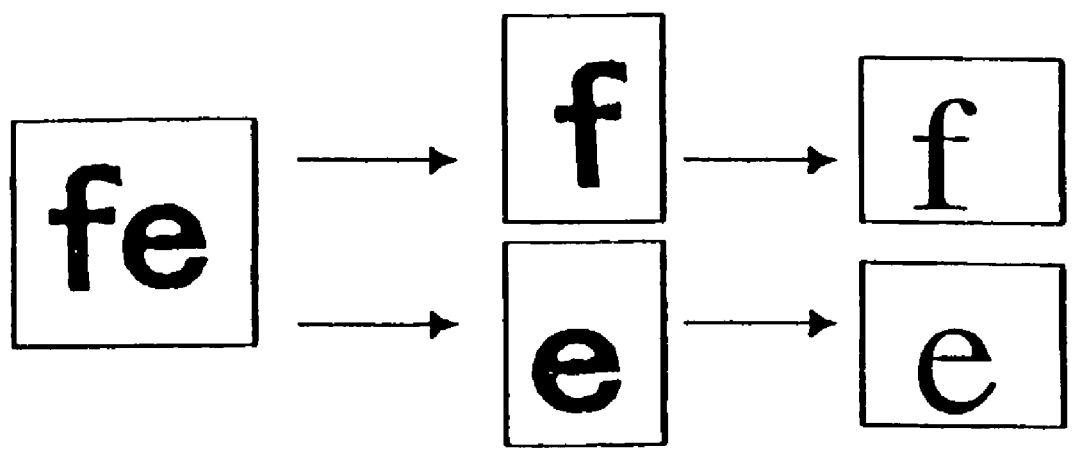
F I G. 1 2

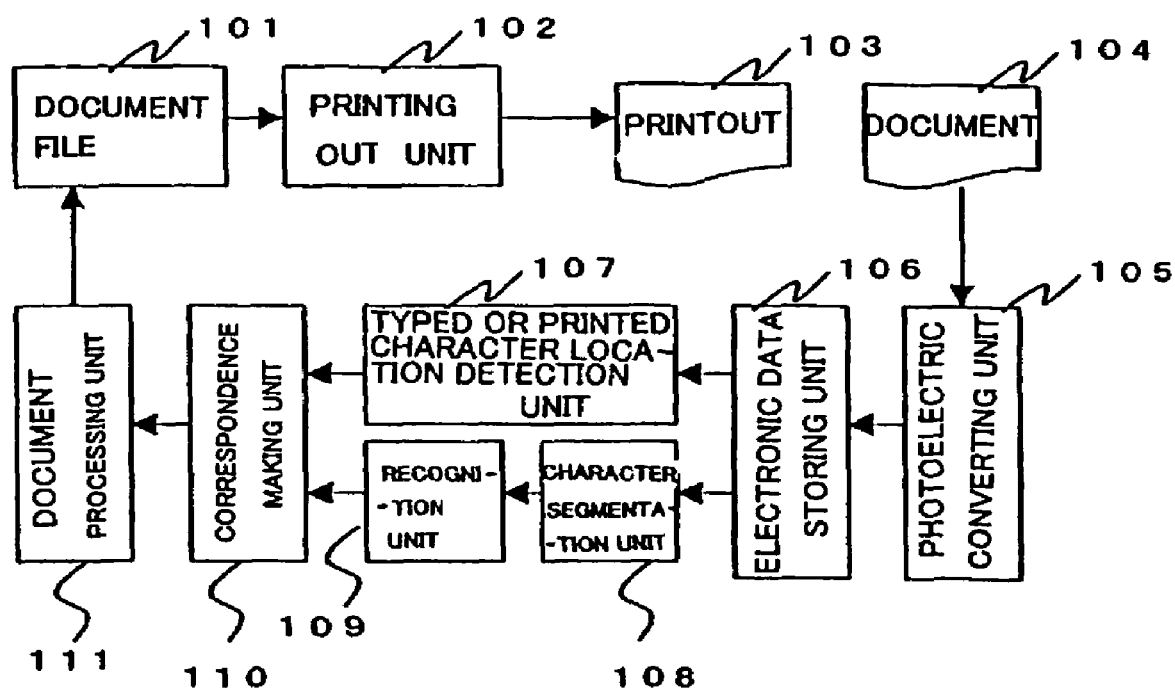
F I G. 13

DOCUMENT PROCESSING METHOD, RECORDING MEDIUM RECORDING DOCUMENT PROCESSING PROGRAM AND DOCUMENT PROCESSING DEVICE

TECHNICAL FIELD

The present invention relates to a method of processing a document, a recording medium recorded with a document processing program, and an apparatus for processing a document. The invention relates more particularly to a method of processing a document, a recording medium recorded with a document processing program, and an apparatus for processing a document which are applicable to a field of information equipment, and capable of simply carrying out correction of recognized characters.

BACKGROUND ART

In general, in an apparatus for processing characters, it is technically important to carry out segmentation of written characters and to detect their locations (lines and character locations) on a document. Moreover, when a correction character was written with a black pencil or the like on a document text with typed or printed characters, it was necessary to carry out segmentation of the written character or the like from the document.

Thus, the document was conventionally printed out by using colored ink to which an image leader is insensitive to thereby separate the typed characters and the written correction character.

FIG. 13 shows a configuration diagram of a conventional document processing apparatus. The document processing apparatus is provided with a document file 101, a printing out unit 102, a photoelectric converting unit 105, an electronic data storing unit 106, a typed or printed character location detection unit 107, a character segmentation unit 108, a recognition unit 109, a correspondence making unit 110, and a document processing unit 111.

FIG. 14 is an explanatory diagram about conventional document processing.

Contents of the document file 101 are outputted by the printing out unit 102 with colored ink being used for obtaining a printout 103. For example, in an input of correction 114, a recognized document 114a is printed by colored ink with marks 114b indicating character locations and a mark 114c indicating a line location being printed together in black. On the input of correction 114, there are written a correction sign and a correction character 114d. The document of correction 114, for which the correction sign is written on the printout 103, is obtained as a result of photoelectric conversion 115 by the photoelectric converting unit 105 insensitive to the colored ink, and stored in the electronic data storing unit 106. Then, in the typed character location detection unit 107, on the basis of the result of photoelectric conversion 115, locations on the electronic data at which typed characters are written are detected by marks 115b indicating character locations and a mark 115c indicating a line location. Meanwhile, in the character segmentation unit 108, on the basis of the same result of photoelectric conversion 115, the written correction sign and correction character 115d are detected for obtaining locations thereof on the electronic data, and along with this, are recognized by the recognition unit 109.

In the correspondence making unit 110, on the basis of a result obtained in the typed character location detection unit 107 and a result obtained in the character segmentation unit 108, the written character is made to correspond to a character to be corrected as to in which line and where in the line the character to be corrected is. Then, the document correction unit 111 corrects the document file 101.

DISCLOSURE OF THE INVENTION

In the conventional processing, however, a color printer was necessary for printing out. Moreover, colors to be used must be selected as being ones to which the photoelectric converting unit is insensitive. Furthermore, in the conventional processing, some types of photoelectric converting units were not necessarily insensitive to definite colors to sometimes made location detection on the document difficult. In addition, in the conventional processing, for detecting locations of a line and a character, the marks must be outputted simultaneously with the document. This necessitated preparation of a special output format.

In view of the foregoing, it is an object of the invention to provide a method of processing a document, a recording medium recorded with a document processing program, and an apparatus for processing a document in each of which the printout is outputted in dot characters or in a gray color rather than with colored ink, and the gray color is erased from the document so that only a written character is taken out. Moreover, it is another object of the invention to correct an erroneously recognized document by carrying out segmentation of a written character or the like from the document with the written character for correction, and by judging as to on which typed character the character or the like is written. It is still another object of the invention to allow the document to be inputted with an ordinary image leader, FAX, scanner, or the like, and to allow the document to be outputted by a black-and-white printer because of the capability of the invention for correction processing using a text in dot characters or a gray color text. Furthermore, it is further another object of the invention to necessitate no marks for lines and character locations to make special document output processing unnecessary at the time of printing out.

BRIEF DESCRIPTION OF THE DRAWINGS

FIG. 1 is a configuration diagram of a document processing apparatus according to the invention;

FIG. 11 is an explanatory diagram of connection processing;

FIG. 12 is an explanatory diagram of separation processing;

FIG. 13 is a configuration diagram of a conventional document processing apparatus.

SUMMARY OF THE INVENTION

According to the first solving measures of the invention, thee are provided a method of processing a document and a recording medium recorded with a document processing program each comprising:

the output step of outputting a result of reading and recognition of a document in dot characters or in a gray color image;

the correction recognition step of recognizing a correction sign written in the document outputted by the above-described output step; and the correction step of correcting the result of recognition according to the correction sign recognized by the above-described correction recognition step.

According to the second solving measures of the invention, there is provided an apparatus for processing a document comprising:

a document file storing unit for storing a result of reading and recognition of a document;

an output unit for outputting the document file stored in the above-described document file storing unit in dot characters or in a gray color image;

a correction recognition unit for recognizing a correction sign written in a document outputted by the above-described output unit; and a correction unit for correcting the document file stored in the above-described document file storing unit according to the correction sign recognized by the above-described correction recognition unit.

BEST MODE FOR CARRY OUT THE INVENTION

Figure 2:
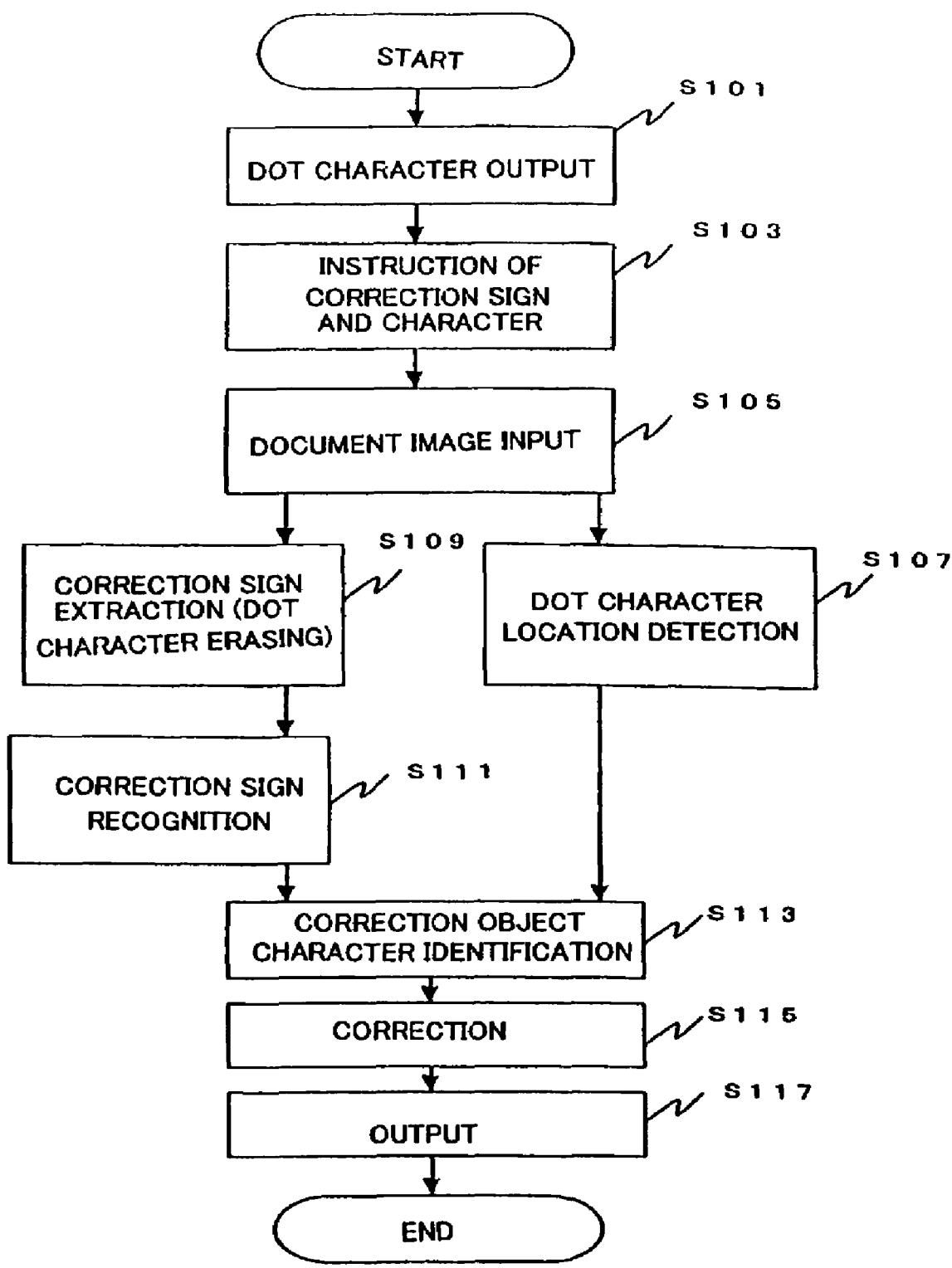
FIG. 2 is a flowchart of a document processing method according to the invention.
Figure 3:
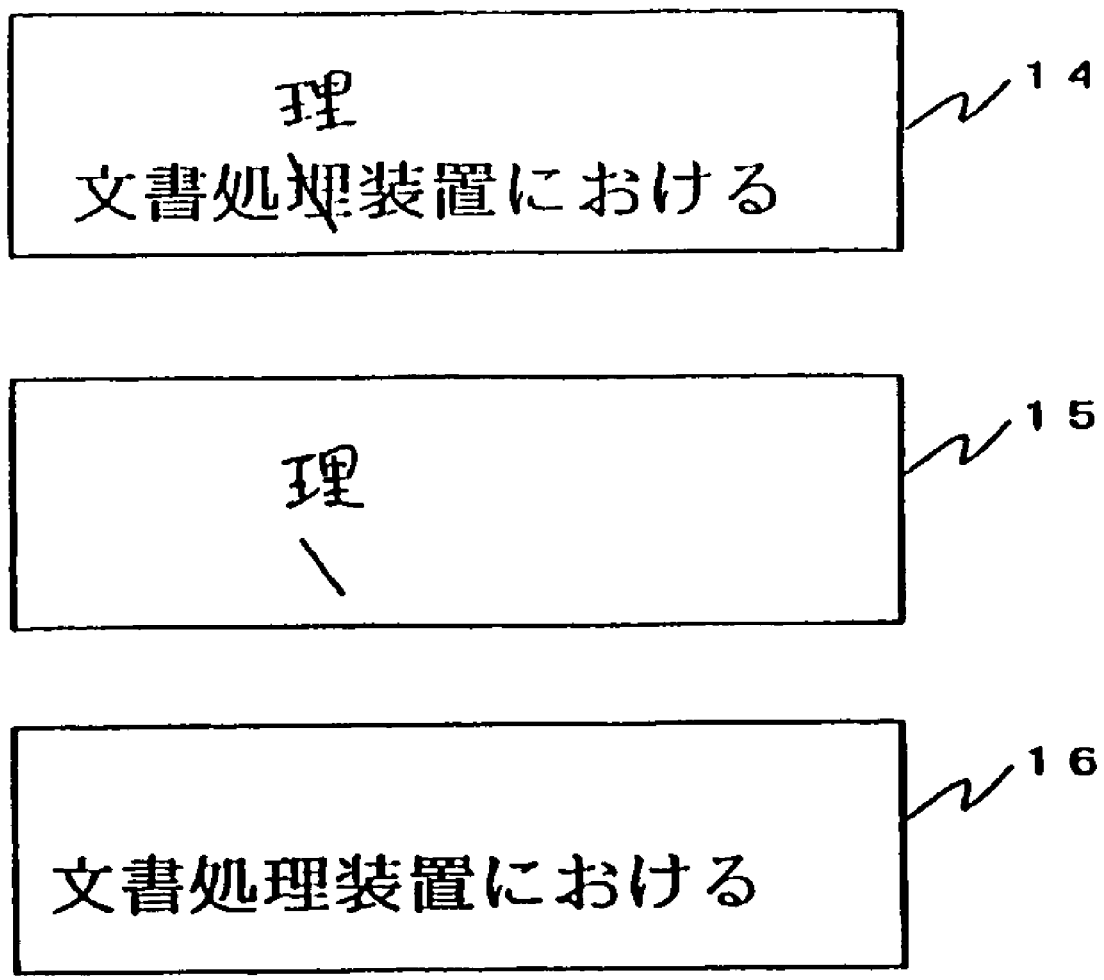
FIG. 3 is an explanatory diagram about the document processing.

In FIG. 1, there is shown a configuration diagram of a document processing apparatus according to the invention. In FIG. 2, there is shown a flowchart of a document processing method according to the invention. Moreover, in FIG. 3, there is shown an explanatory diagram about the document processing;

The document processing apparatus is provided with a document file storing unit 1, an output unit 2, a photoelectric converting unit 5, an electronic data storing unit 6, a character location detection unit 7, a correction recognition unit 8, a character recognition unit 9, a correspondence making unit 10, and a correction unit 11.

At first, the photoelectric converting unit 5 reads a document as an object of recognition to convert the document into electronic data. The electronic data sorting unit 6 stores the electronic data read by the photoelectric converting unit 5. The character recognition unit 9 recognizes the stored document. The document file storing unit 1 reads the document to store a result of recognition.

Next, the output unit 2 outputs the document file stored in the document file storing unit 1 as a printout 3 in dot characters or in a gray color image (S101). An operator writes a sign for correction, further a character therefor as necessary, on the printout 3 to prepare a correction inputted document 14 (S103). Furthermore, an image input of the correction inputted document 14 is provided by the photoelectric converting unit 5 to be prepared as electronic data, which is stored in the electronic data storing unit 6 (S105).

The character location detection unit 7, in the document outputted by the output unit 2, detects the location of the character written with the correction sign (S107). The character location detection unit 7 detects locations of a line and a character from the electronified document image with a focus put on that the typed character is printed with dots. The details thereof will be explained later. Meanwhile, the correction recognition unit 8 carries out recognition of the correction sign and the character written on the correction inputted document 14 (S111). The correct character with which correction is to be carried out can be also recognized by the character recognition unit 9 or the like, for example.

The correspondence making unit 10 makes the location of the character detected by the character location detection unit 7 correspond to the correction sign recognized by the correction recognition unit 8 to specify the character as an object of correction (S113). Namely, correspondence is made as to where of the outputted characters the written correction sign and character are in correspondence with. In this way, a result of sign detection and recognition 15 is obtained.

The correction unit 11, according to the correspondence made by the correspondence making unit 10, corrects the corresponding character by the correction processing corresponding to the correction sign (S115). The correction unit 11, according to the correction sign recognized by the correction recognition unit 8, corrects the document file stored in the document file storing unit 1. Here, in FIG. 3, an instruction with a slash represents a sign of substituting a corresponding typed character by a character written above it, for example. Thus, the correction unit 11, in correspondence with such a written character, carries out processing for correcting "埋" to "理" to the document file storing unit 1. Here, by the character recognition unit 9, the correction recognition unit 8 or the like, the "理" is recognized as a correct character with which correction is to be carried out.

In addition to this, the correction unit 11 can correct the document file by carrying out, for example, word recognition processing, connection processing, and separation processing. About this point, explanation will be presented later.

The output unit 2 reads out the corrected document file from the document file storing unit 1 to output a result of correction 16 (S117). At this time, the output is not limited to be the printout, but can be outputted on a display for recognition.

Figure 4:
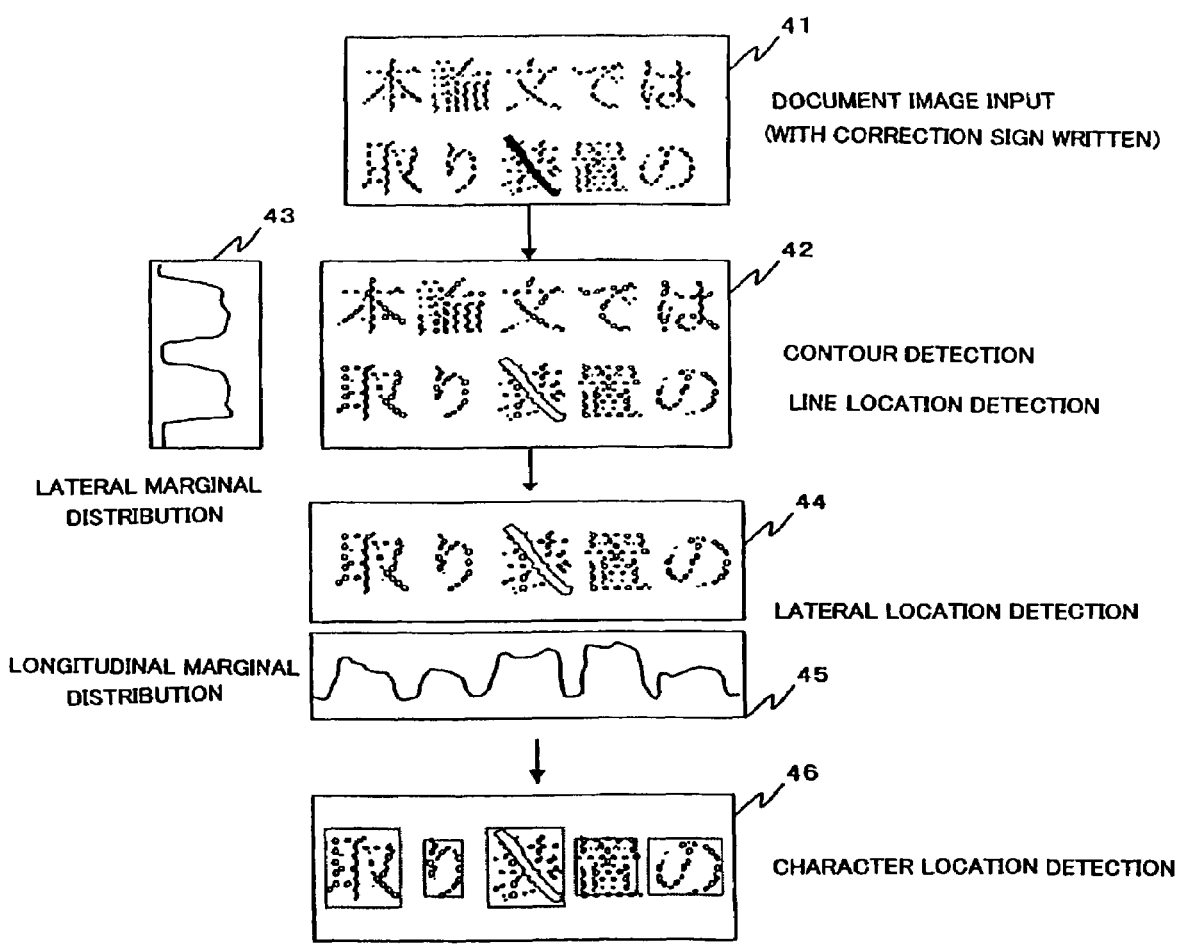
FIG. 4 is an explanatory diagram of printed out character location detection.

In FIG. 4, there is shown an explanatory diagram of printed out character location detection.

The character location detection unit 7 is to detect a location of a character by the integrating the number of pixels in each of the lateral and longitudinal directions about an edge image of the inputted document. Specifically, a contour image is first formed for the image to be emphasized. On the contour image, the number of black pixels is counted in the horizontal direction to detect the locations of lines. Next, in each line, the number of black pixels is counted in the vertical direction to detect locations of characters.

In the example, an explanation will be made about the detection of locations of characters printed out as "本論文では (in this paper)" in the first line and as "取り装置の (of a reading device (with the word "reading" partially shown in Japanese))" in the second line. This is carried out by the character location detection unit 7. First, a character image 41 is inputted on which a correction sign has been written already. On the basis of the character image, a contour of each of the pixels is detected to obtain a contour image 42. Further, about the detected contour image 42, an integration or addition of the number of pixels is carried out in the lateral direction to obtain a lateral marginal distribution 43. With the lateral marginal distribution, locations of lines can be detected. Next, about each of the lines obtained, segmentation of the detected contoured image 44 is similarly carried out with the segmented pixels integrated or added to the longitudinal direction to obtain a longitudinal marginal distribution 45. With the longitudinal marginal distribution 45, locations (lateral locations) of characters in each line can be obtained. As in the foregoing, about a certain character, the row and column thereof are specified, so that a character location detection image 46 can be obtained. In this way, even when a thick correction sign is written, there is remained only a contour thereof. Thus, compared with the case of detecting no contour, an influence of written correction sign can be lessened.

Figure 5:
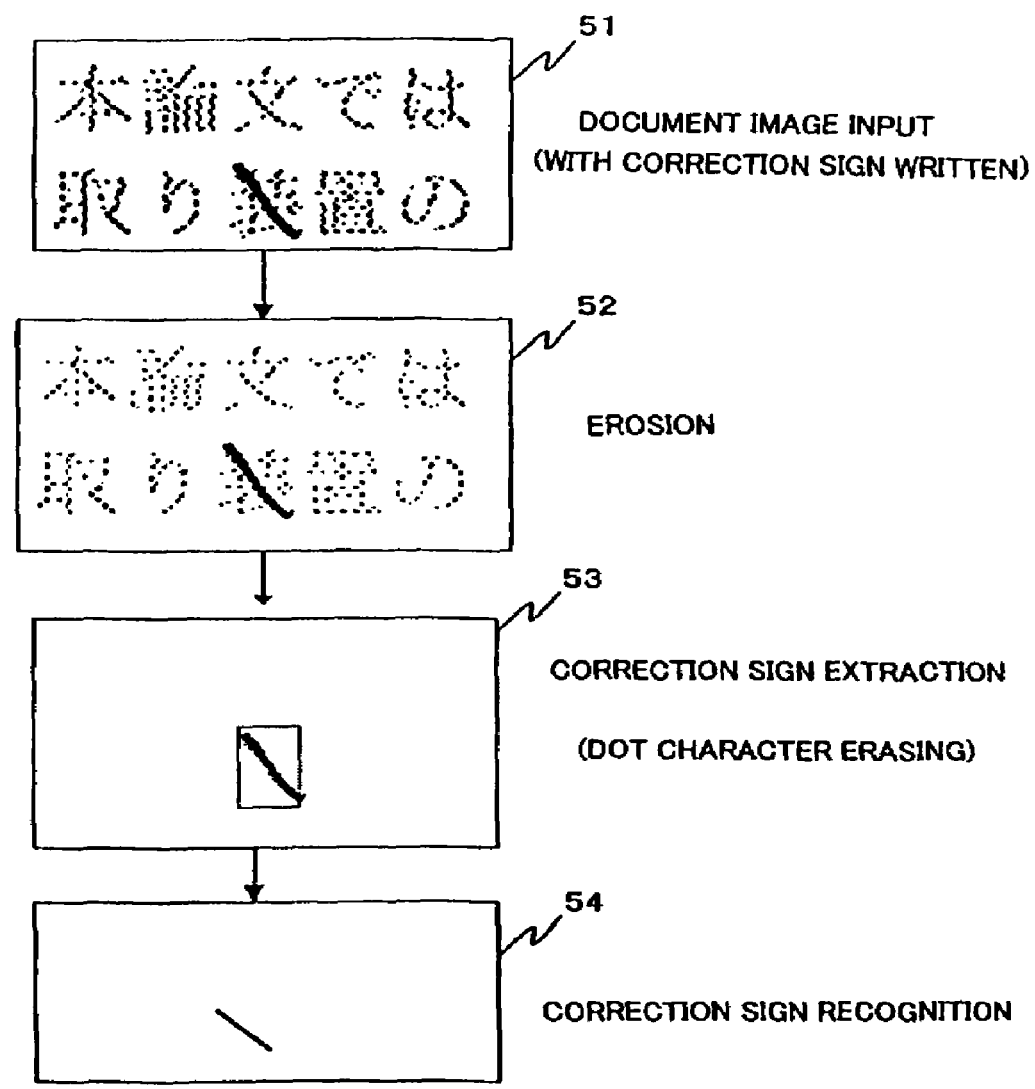
FIG. 5 is an explanatory diagram of recognition of a correction sign.

In FIG. 5, there is shown an explanatory diagram of recognition of a correction sign.

The correction recognition unit 8, in extraction of the correction sign (detection of a written character), obtains connected components of pixels from the correction inputted document 14 and, on the basis of the number of pixels of the obtained connected components, removes black connected components equal to or less than the predetermined size. This leaves only the correction signs for carrying out segmentation of each of the left correction signs. The correction recognition unit 8 is provided with erosion processing in which, when carrying out the segmentation of the correction sign, a black pixel adjacent to a white pixel is made as an edge, and the edge is removed from the original image, for example.

In the example, an explanation will be made about a correction sign written on the character "装" of the characters printed out as "取り装置の". First, a character image 51 is inputted in which the correction sign has been already written. Next, on the basis of the character image 51, conversion to a eroded image 52 is carried out for which each pixel is subjected to the erosion processing.

Figure 6:
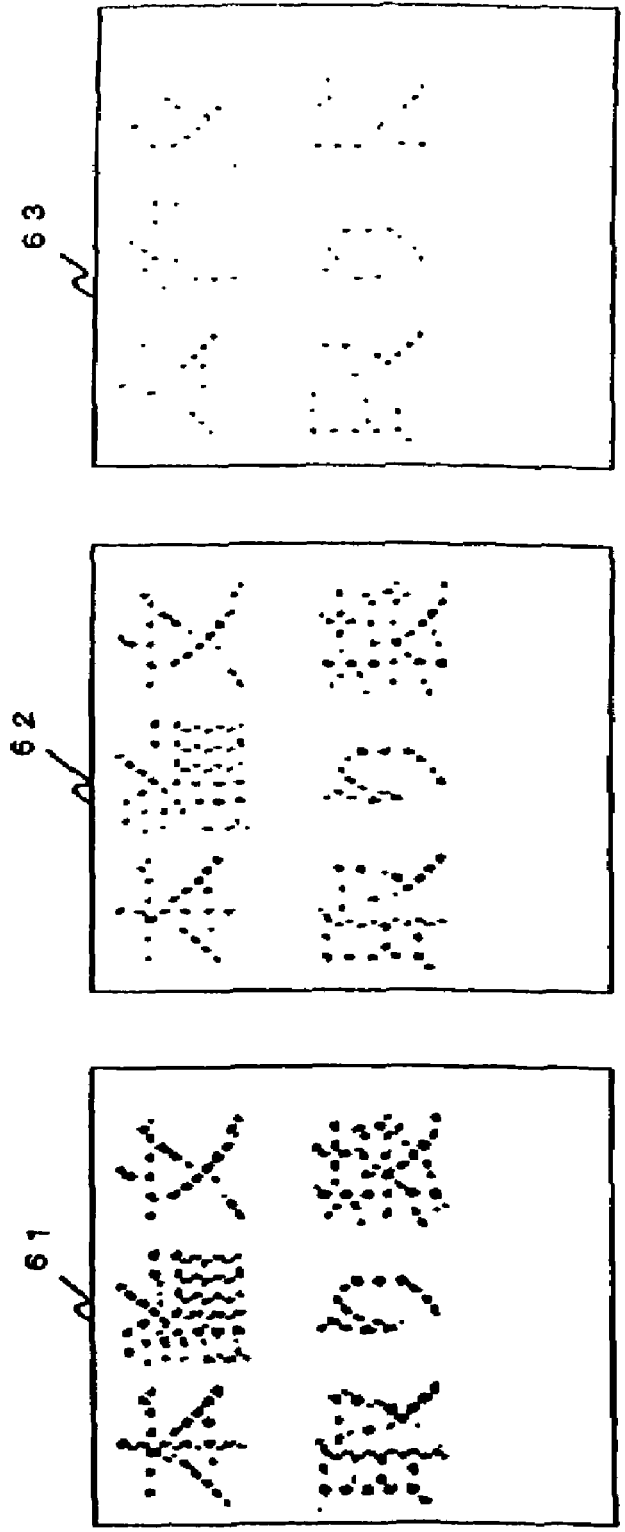
FIG. 6 is an explanatory diagram of erosion processing.

In FIG. 6, there is shown an explanatory diagram of the erosion processing. Moreover, in FIG. 7, there is shown an explanatory diagram of an edge image.

Figure 7:
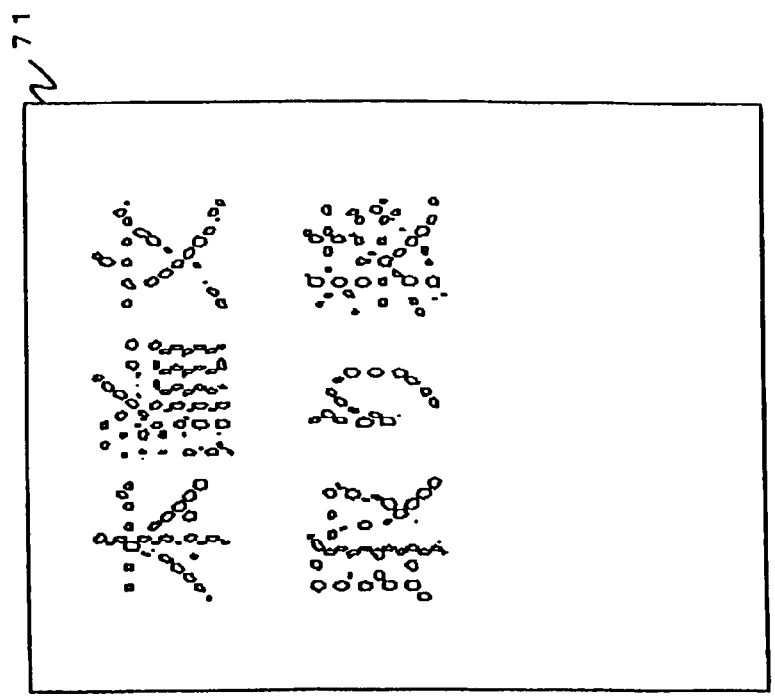
FIG. 7 is an explanatory diagram of an edge image.

For example, to an inputted image 61, an edge of each pixel is extracted to provide the edge image 71 in FIG. 7. Namely, an edge is an extraction of black pixels which are adjacent to white pixels. The extraction of edge may be doubled, tripled and so on. The edge image 71 is removed to provide a first eroded image 62. Further, about the first eroded image 62, an edge image thereof is obtained, which is removed from the first eroded image 62 to provide a second eroded image 63.

By carrying out the erosion processing appropriate times to erase the dot characters, a correction sign extraction image 53 is obtained in which the correction sign is extracted. As a method of erasing the dot characters, there is also one in which connected components as parts of connected black pixels are obtained to obtain the number of black pixels in each of the connected components, for example. In the method, by further leaving connected components with the number of the black pixels equal to or more than a predetermined threshold value, the correction sign can be extracted. Next, the correction recognition unit 8 carries out segmentation of the correction sign to recognize as to for what kind of correction instruction the correction sign is, by which a result of correction sign recognition 54 is obtained.

In the foregoing, explanations were made about correction signs and characters. In the invention, however, there can be extracted correction signs for instructing various corrections. Thus, in the next, explanations will be made about the correction processing, the word processing, the connection processing, and the separation processing carried out by the correction recognition unit 8, the correspondence making unit 10, the correction unit 11, and the like.

Figure 8:
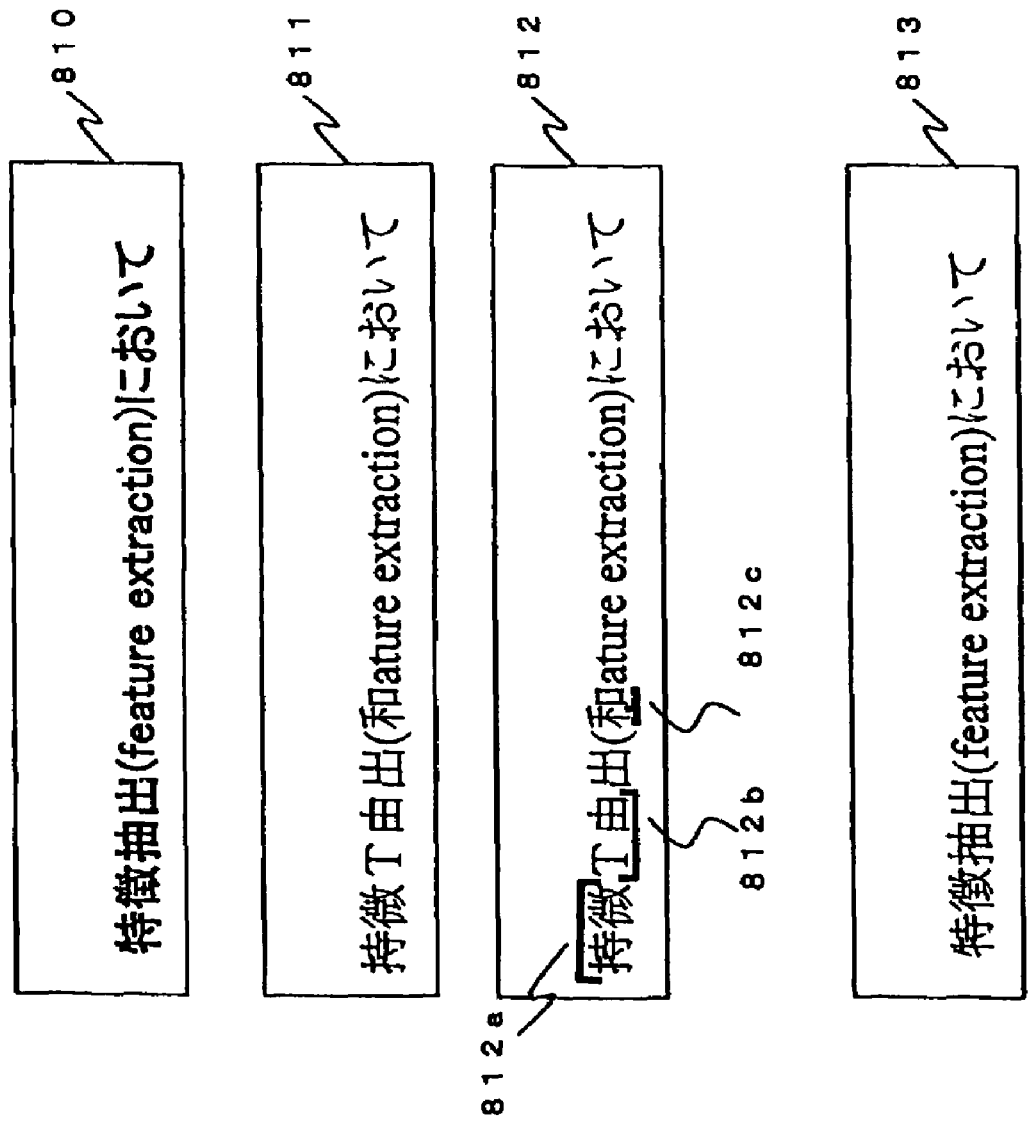
FIG. 8 is an explanatory diagram about various kinds of processing for correction.
Figure 9:
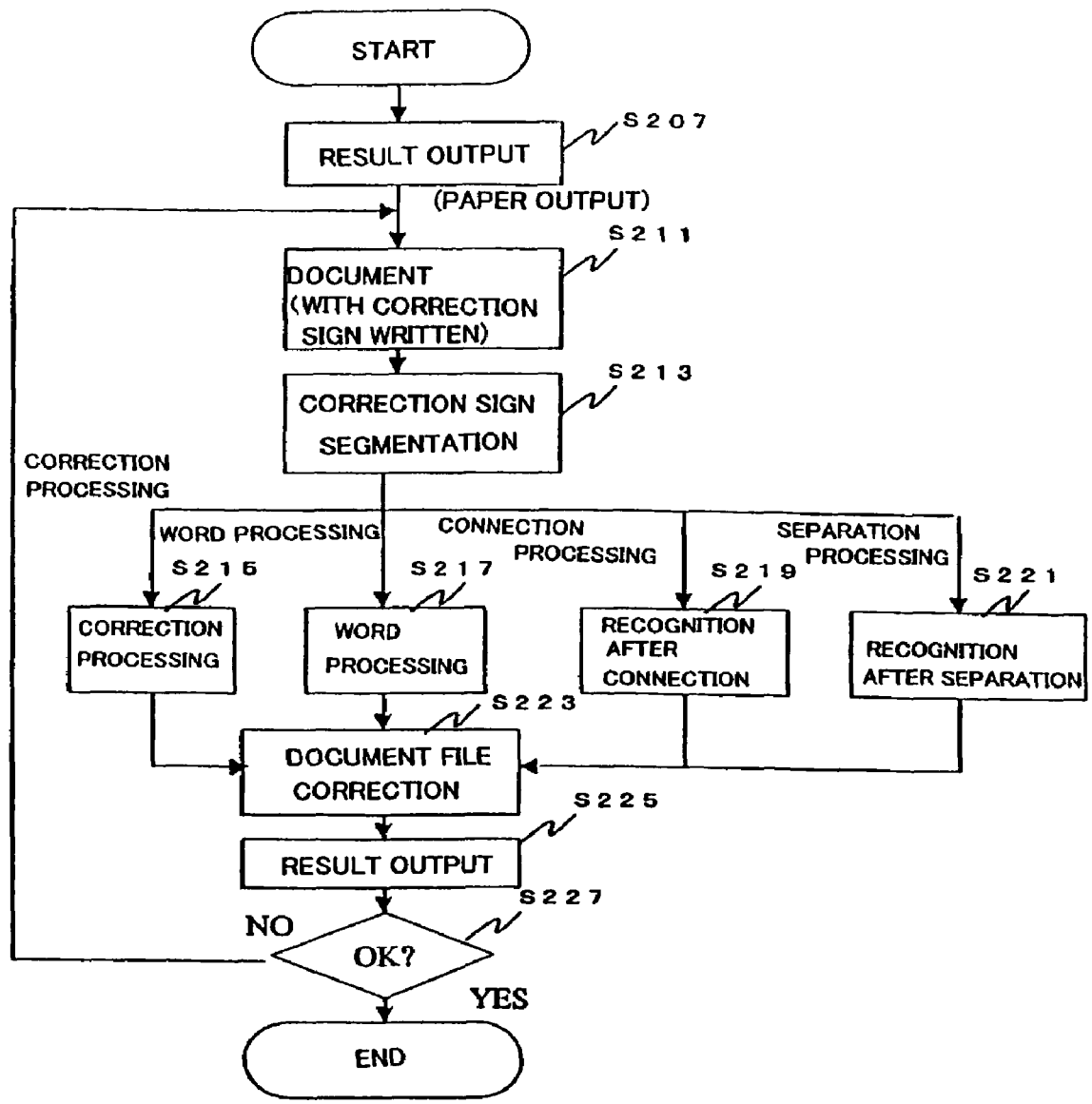
FIG. 9 is a flowchart of various kinds of processing for correction.

In FIG. 8, there is shown an explanatory diagram about various kinds of processing for correction. Moreover, in FIG. 9, there is shown a flowchart of the various kinds of processing for correction.

The output unit 2 outputs a result of recognition (S207). Here, a recognized output 811 is taken as being outputted. The output is taken as being outputted in dot characters or in gray color.

When a paper output is provided, an operator provides instruction for correction details to insufficiently recognized characters or document (S211). The instruction for correction details here is carried out, for example, with correction signs of a first sign 812a, a second sign 812b, and a third size 812c in an input of correction 12 written with the correction signs. In the example of the correction signs, the first sign 812a, the second sign 812b, and the third sign 812c are signs for instructing the word processing, connection of character patterns, and the separation procesing of a character pattern, respectively.

The correction recognition unit 8 carries out segmentation of the written connection signs (S13). Here, when a correction character is recognized as being for the connection processing for correcting one character, the correction processing as described above is carried out (S215).

Moreover, when the segmented correction character is recognized as being for the word processing, the word processing is carried out in which, in recognition candidate characters, from combinations of candidate characters in character groups corresponding to the sign, there is obtained a combination of characters with the highest probability as a word (S217).

Figure 10:
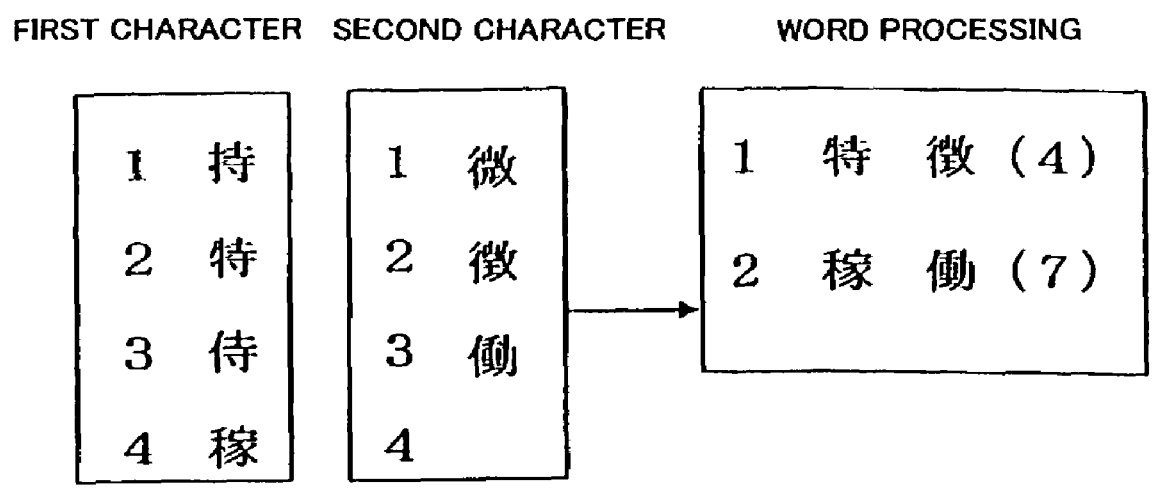
FIG. 10 is an explanatory diagram of word processing.
Figure 14:
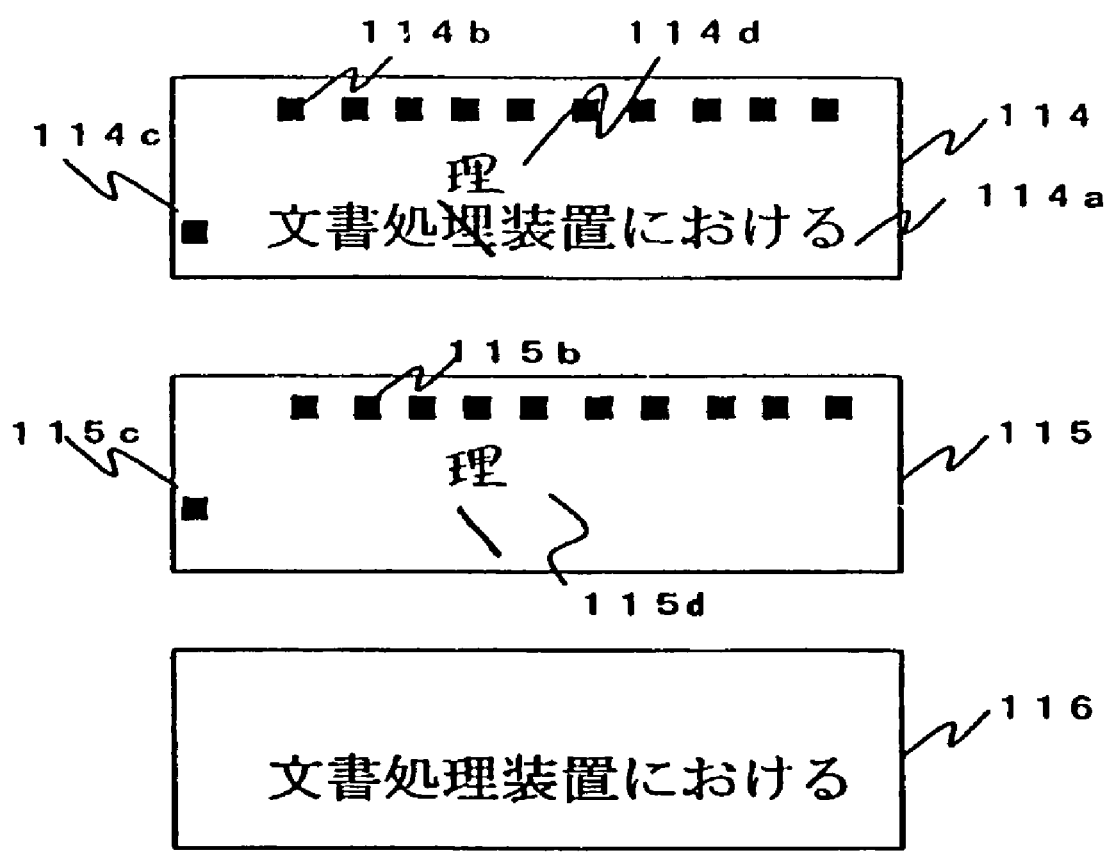
FIG. 14 is an explanatory diagram about conventional document processing.

In FIG. 10, there is shown an explanatory diagram of the word processing. In character recognition, the recognition is generally carried out about individual character patterns to output each of the recognition candidate characters in the first place as a result of recognition. When the outputted characters are judged as a word with a combination of two characters, for example, there is imposed limitation in holding the characters as a word in the combination of the first and the second characters. This reduces faulty recognition. For example, letting four characters be judged as recognition candidate as a result of recognition of the first character. Namely, there are judged the first candidate "持", the second candidate "特", the third candidate "侍", and the fourth candidate "稼". In addition, letting three characters be judged as recognition candidate as a result of recognition of the second character, namely, the first candidate "微", the second candidate "徴", and the third candidate "働". In the result of a character-by-character recognition, each of the first candidates "持" and "微" was selected. However, in the word processing, instruction is given so that these two characters are to be recognized as a word. Thus, a combination of the characters is examined with respective candidates. For example, it is judged that a combination with the respective second candidates "特" and "微" provides 4 as a sum of priorities of the candidates (2+2), and a combination with the fourth candidate "稼" and the third candidate "働" provides 7 as a sum of priorities of the candidates (4+3). Accordingly, as a result of the word processing, the first candidate "特徴 (characteristics)" and the second candidate "稼動 (operation)" are judged as recognition candidates in descending order of priority (namely, in ascending order of the sum of priorities). Here, the first candidate "特徴" is recognized as the result of the word processing.

Moreover, when the correction processing is recognized as being the connection processing of character patterns, the connection processing is carried out in which a plurality of corresponding character patterns are connected to be recognized as one character (S219).

In FIG. 11, there is shown an explanatory diagram of the connection processing. In the connection processing, character patterns corresponding to two or more characters instructed by the correction sign are once again recognized as one character pattern. Here, an instruction was given for combining "T" and "由" as the results of recognition. Then, as a result of recognition carried out once again, "抽" was recognized.

When the correction processing is recognized as being the separation processing of a character pattern, the separation processing is carried out in which the processing is once again carried out from character segmentation about the corresponding character pattern (S217).

In FIG. 12, there is shown an explanatory diagram of the separation processing. In the separation processing, a character pattern corresponding to a character instructed by a correction sign is taken as two character patterns to be subjected to segmentation and recognized once again. Here, an instruction is given for separating "和" as a result of recognition. Thus, as a result of recognition carried out once again, "f" and "e" were recognized.

The correction unit 8 corrects the document file storing unit 3 in compliance with each of the kinds of processing (S223) to output a result of correction 813 (S225). Here, when no satisfactory result is obtained (S229), the processing returns to the step S211 to repeat the processing. When the correction has been carried out sufficiently, the processing is terminated.

In the invention, the gray color is not limited to be dotted, but may be a font of a contour or a font constituted by oblique hatching, unless it is solid black. Moreover, methods for the character location detection, the written character location detection, the recognition and the like are not limited to the above on condition that similar effects are obtained. Each of signs for correcting the document is shown as an example and correction signs are not limited thereto. In the character location detection method, locations of lines or characters may be detected with appropriate methods such as a method that detects continuous typed characters so as to detect a line, or a method that detects rows and columns by detecting spaces between lines and spaces between characters. Furthermore, as for inputting and outputting carried out between each of kinds of processing such as transfer of a document file, a communication network such as Internet can be used.

INDUSTRIAL APPLICABILITY

According to the invention, as described in the foregoing, a method of processing a document, a recording medium recorded with a document processing program, and an apparatus for processing a document can be provided in each of which the printout of the document is outputted in dot characters or in gray color rather than in colored ink, and the gray color is erased from the document so that the written character is taken out. Moreover, according to the invention, an erroneously recognized document can be corrected by carrying out segmentation of a written character or the like from the document with the written character for correction, and by judging as to one which typed character the character or the like for correction is written. According to the invention, the document can be made inputted with an ordinary image leader, FAX, scanner, or the like, and can be made outputted by a black-and-white printer because the invention males it possible to carry out correction processing by using a text in dotted texture or in a gray color. Furthermore, according to the invention, no marks for lines and character locations are made necessitated to make special document output processing unnecessary at the time of printing out.

The invention claimed is:

1. A method of processing a document comprising:
    an output step for outputting a document file in dot characters or in a gray color image, each character of the document file is printed by a plurality of dots in dot characters or in a gray image, which has the densities of which each dot of the character is independent or becomes independent by erosion processing;
    an input step for inputting a correction inputted document in which a correction sign is inputted to a document outputted by said output step;
    a character location detection step for detecting a location of a character written with the correction sign in the correction inputted document inputted by said input step;
    a correction recognition step for recognizing said correction sign about the correction inputted document inputted by said input step, by carrying out a erosion proceeding to erase the dot characters and extracting the correction, or by obtaining connected components of pixels and extracting the correction sign on the basis of the obtained number of pixels of the connected components;
    a correspondence making step for making the location of the character detected by said character location detection step correspond to the correction sign recognized by said correction recognition step; and
    a correction step, according to the correspondence made by said correspondence making step, for correcting a corresponding character by correction processing corresponding to the correction sign recognized by said correction recognition step.

2. The method of processing a document as claimed in claim 1 characterized in that said correction recognition step comprises an erosion step for, with a black pixel adjacent to a white pixel taken as an edge, removing the edge from an original image.

3. The method of processing a document as claimed in claim 1 characterized in that said character location detection step
    is made so as to detect location of the character by integrating the number of pixels in each of the lateral and longitudinal directions about an edge image of an inputted document.

4. The method of processing a document as claimed in claim 1 characterized in that said correction step further carries out any one or a plurality of word recognition processing, connection processing and separation processing.

5. A computer readable medium recorded with a document processing program comprising:
    an output step for outputting document file in dot characters or in a gray color image, each character of the document file is printed by a plurality of dots in dot characters or in a gray image, which has the densities of which each dot of the character is independent or becomes independent by erosion processing;

an input step for inputting a correction inputted document in which a correction sign is inputted to a document outputted by said output step;

a character location detection step for detecting a location of a character written with the correction sign in the correction inputted document inputted by said input step;

a correction recognition step for recognizing said correction sign about the correction inputted document inputted by said input step, by carrying out a erosion proceeding to erase the dot characters and extracting the correction, or, by obtaining connected components of pixels and extracting the correction sign on the basis of the obtained number of pixels of the connected components;

a correspondence making step for making the location of the character detected by said character location detection step correspond to the correction sign recognized by said correction recognition step; and a correction step, according to the correspondence made by said correspondence making step, for correcting a corresponding character by correction processing corresponding to said correction sign recognized by said correction recognition step.

6. An apparatus for processing a document comprising:

document file storing means for storing a result or reading and recognition of a document;

an output means for outputting a document file stored in said document file storing means in dot characters or in a gray color image, each character of the document file is printed by a plurality of dots in dot characters or in a gray image, which has the densities of which each dot of the character is independent or becomes independent by erosion processing;

an input means for inputting a correction inputted document in which a correction sign is inputted to a document outputted by said output means;

a character location detection means for detecting a location of a character written with the correction sign in the correction inputted document inputted by said input means;

a correction recognition means for recognizing said correction sign about the correction inputted document inputted by said input means, by carrying out a erosion proceeding to erase the dot characters and extracting the correction, or by obtaining connected components of pixels and extracting the correction sign on the basis of the obtained number of pixels of the connected components;

a correspondence making means for making the location of the character detected by said character location detection means correspond to the correction sign recognized by said correction recognition means; and a correction means, according to the correspondence made by said correspondence making means, for connecting a corresponding character by correction processing corresponding to said correction sign recognized by said correction recognition means.

7. A computer implemented method comprising:

an output step for outputting a document file in dot characters on in a gray color image, each character of the document file is printed by a plurality of dots in dot characters or in a gray image, which has the densities of which each dot of the character is independent or becomes independent by erosion processing;

an input step for inputting a correction inputted document in which a correction sign is inputted to a document outputted by said output step;

a character location detection step for detecting a location of a character written with the correction sign in the correction inputted document inputted by said input step;

a correction recognition step for recognizing said correction sign about the correction inputted document inputted by said input step, by carrying out a erosion proceeding to erase the dot characters and extracting the correction, or, by obtaining connected components of pixels and extracting the correction sign on the basis of the obtained number of pixels of the connected components;

a correspondence making step for making the location of the character detected by said character location detection step correspond to the correction sign recognized by said correction recognition step; and a correction step, according to the correspondence made by said correspondence making step, for correcting a corresponding character by correction processing corresponding to the correction sign recognized by said correction recognition step.

8. A computer program product on a computer readable medium that enables a computer to process documents, said product storing at least instructions for:

an output step for outputting a document file in dot characters or in a gray color image, each character of the document file is printed by a plurality of dots in dot characters or in a gray image, which has the densities of which each dot of the character is independent or becomes independent by erosion processing;

an input step for inputting a correction inputted document in which a correction sign is inputted to a document outputted by said output step;

a character location detection step for detecting a location of a character written with the correction sign in the correction inputted document inputted by said input step;

a correction recognition step for recognizing said correction sign about the correction inputted document inputted by said input step, by carrying out a erosion proceeding to erase the dot characters and extracting the correction, or, by obtaining connected components of pixels and extracting the correction sign on the basis of the obtained number of pixels of the connected components;

a correspondence making step for making the location of the character detected by said character location detection step correspond to the correction sign recognized by said correction recognition step; and a correction step, according to the correspondence made by said correspondence making step, for correcting a corresponding character by correction processing corresponding to the correction sign recognized by said correction recognition step.

9. An apparatus for processing a document file, comprising:

a document file storing memory for storing a result of reading and recognition of the document file;

an output device for outputting a document file in dot characters or in a gray color image, each character of the document file is printed by a plurality of dots in dot characters or in a gray image, which has the densities of which each dot of the character is independent or becomes independent by erosion processing to create an outputted document file;

an input device for inputting a correction inputted document in which a correction sign is inputted to a document outputted by said output device;

a location device for detecting a location of a character written with the correction sign in the correction inputted document inputted by said input device;

a recognition device for recognizing said correction sign about the correction inputted document inputted by said input device, by carrying out a erosion proceeding to erase the dot characters and extracting the correction, or by obtaining connected components of pixels and extracting the correction sign on the basis of the obtained number of pixels of the connected components;

a correspondence making device for making the location of the character detected by said location device correspond to the correction sign recognized by said recognition device; and a correction device for correcting a corresponding character by correction processing corresponding to the correction sign recognized by said correction recognition device.

10. The apparatus of claim 9, further comprising:

said location device for detecting said location of said character or characters associated with said correction sign in said outputted document file; and said correspondence making device for corresponding said location to said correction sign recognized by said recognition device, such that said correction device can correct said character or said characters according to the correspondence made by said correspondence making device by correction processing corresponding to said correction sign.

11. A method of processing a document comprising:

marking a correction sign near at least one character for correction on an image of said document to form a marked document;

inputting an image representation of said marked document to computer memory;

programmatically determining a location of said correction sign in said image representation;

programmatically detecting a location of said at least one character for correction in said image representation;

programmatically determining a correction value of said correction sign in said image representation; and programmatically changing said image representation to implement a correction to said at least one character for correction, wherein said correction is indicated by said correction value, thereby generating a corrected image representation of said document.

12. The method of claim 11 wherein said programmatically determining said correction value comprises erosion processing said image representation.

13. The method of claim 11 wherein said programmatically determining said correction value comprises determining connected components.

14. The method of claim 11 further comprising printing said corrected image representation of said document.

* * * * *

UNITED STATES PATENT AND TRADEMARK OFFICE
CERTIFICATE OF CORRECTION

PATENT NO.       : 7,142,733 B1
APPLICATION NO.  : 10/049102
DATED            : November 28, 2006
INVENTOR(S)      : Nakagawa It is certified that error appears in the above-identified patent and that said Letters Patent is hereby corrected as shown below:

In column 9 lines 59-60: "for connecting" should read: --for correcting--.

Signed and Sealed this

Thirtieth Day of January, 2007

JON W. DUDAS
*Director of the United States Patent and Trademark Office*